US010012723B2

(12) United States Patent
Lindskog et al.

(10) Patent No.: US 10,012,723 B2
(45) Date of Patent: Jul. 3, 2018

(54) MODULAR LIDAR SYSTEM

(71) Applicant: Amazon Technologies, Inc., Seattle, WA (US)

(72) Inventors: Jon Lewis Lindskog, Seattle, WA (US); Robert Todd Marks, Seattle, WA (US); Liam Stewart Cavanaugh Pingree, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 348 days.

(21) Appl. No.: 14/741,347

(22) Filed: Jun. 16, 2015

(65) Prior Publication Data

US 2016/0291136 A1  Oct. 6, 2016

Related U.S. Application Data

(60) Provisional application No. 62/141,179, filed on Mar. 31, 2015.

(51) Int. Cl.
*G01S 7/48* (2006.01)
*B64C 39/02* (2006.01)
(Continued)

(52) U.S. Cl.
CPC ............ *G01S 7/4813* (2013.01); *B64C 39/02* (2013.01); *G01S 7/4817* (2013.01); *G01S 17/42* (2013.01);
(Continued)

(58) Field of Classification Search
CPC ...... G01S 7/481; G01S 7/4811; G01S 7/4813; G01S 7/4817; B64C 2201/024; B64C 2201/108; B64C 2201/141
See application file for complete search history.

(56) References Cited

U.S. PATENT DOCUMENTS 5,557,397 A   9/1996  Hyde et al.
7,969,558 B2  6/2011  Hall
(Continued)

FOREIGN PATENT DOCUMENTS

WO   WO2013059720   4/2013

OTHER PUBLICATIONS

The PCT Search Report and Written Opinion dated Aug. 31, 2016 for PCT application No. PCt/us2016/024971, 16 pages.
(Continued)

*Primary Examiner* — Eric L Bolda
(74) *Attorney, Agent, or Firm* — Lee & Hayes, PLLC

(57) ABSTRACT

A modular LIDAR system may be formed of multiple LIDAR components. Each LIDAR component may include a laser emitter and a laser detector configured in a frame. Multiple LIDAR components may be arranged on a rotatable swivel housing. The rotatable housing may rotate about a first axis that is perpendicular to a plane defined by a mounting base. The multiple LIDAR components may be aimed outward from the swivel housing at different directions, which may range up to 90 degrees or up to 180 degrees in separation in some embodiments. When the rotatable housing is rotated completely around the first axis, the multiple LIDAR components may scan a first field of view of 360 degrees around the first axis and may scan a second field of view of substantially 180 degrees about a second axis. The modular LIDAR system may be implemented with an aircraft for navigational purposes.

20 Claims, 10 Drawing Sheets

(51) Int. Cl.
*G01S 17/89* (2006.01)
*G01S 17/42* (2006.01)
*G01S 17/93* (2006.01)
*G01S 7/481* (2006.01)
*G01S 17/95* (2006.01)

(52) U.S. Cl.
CPC .............. *G01S 17/89* (2013.01); *G01S 17/93* (2013.01); *G01S 17/95* (2013.01)

(56) References Cited

U.S. PATENT DOCUMENTS

| | | | | |
|---|---|---|---|---|
| 2007/0201027 | A1* | 8/2007 | Doushkina | G01N 21/47 356/338 |
| 2011/0216304 | A1* | 9/2011 | Hall | G01S 7/4813 356/4.01 |
| 2012/0170024 | A1* | 7/2012 | Azzazy | G01J 3/0202 356/51 |
| 2014/0034776 | A1* | 2/2014 | Hutson | B64D 45/00 244/17.17 |
| 2014/0071234 | A1 | 3/2014 | Millett | |
| 2014/0111812 | A1* | 4/2014 | Baeg | G01B 11/25 356/610 |
| 2014/0263823 | A1* | 9/2014 | Wang | B64C 39/028 244/17.23 |
| 2015/0260843 | A1* | 9/2015 | Lewis | G02B 26/108 356/5.01 |
| 2016/0061954 | A1* | 3/2016 | Walsh | G01S 17/89 356/139.03 |
| 2016/0282453 | A1* | 9/2016 | Pennecot | G01S 7/4972 |
| 2016/0313734 | A1* | 10/2016 | Enke | G05D 1/0088 |

OTHER PUBLICATIONS

Dorninger, et al., "Scan-Copter 2.0 a product of 4D-IT GmbH & von-oben e.U. High-Quality 3D Documentation supported by UAV Strength by Cooperation 3D Documentation Multimedia Applications Data Processing Sensor Integration UAV Development Professional Photographer Documentation Multimedia Productions", May 14, 2014, retrieved from the internet at URL:http://scan-copter.4d-it.com/SC_info.pdf on Jul. 23, 2015, pp. 12, 16.

The PCT Invitation to Pay Additional Fees dated Jun. 30, 2016 for PCT application No. PCT/US2016/024971, 10 pages.

The Canadian Office Action dated Dec. 4, 2017 for Canadian Patent Application No. 2977832, a counterpart foreign application of U.S Appl. No. 14/741,347, 4 pages.

* cited by examiner

MODULAR LIDAR SYSTEM

CROSS REFERENCE TO RELATED APPLICATIONS

This application is based on and claims priority to U.S. Provisional Application No. 62/141,179, filed on Mar. 31, 2015, entitled, "Modular LIDAR System," the contents of which are herein incorporated by reference.

BACKGROUND

Light Detection and Ranging ("LIDAR") systems are used to determine distances from objects using time-of-flight of light generated by a laser. LIDAR systems may be used in fixed locations or on moving objects to capture data about those objects and/or a surrounding area. One example use of LIDAR is to map geographic terrain. To perform terrain mapping, a LIDAR system may be aimed in a fixed position toward the earth and flown over an area of the earth that is desired to be mapped. In this approach, the LIDAR system mapping may be analogous to combing over the terrain. In this example, and in most typical arrangements, LIDAR systems are used to capture distance data in a single direction.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

This disclosure is directed to a modular LIDAR system formed of multiple LIDAR components. Each LIDAR component may include a laser emitter and a laser detector configured in a frame. Multiple LIDAR components may be arranged on a rotatable swivel housing, which may be a chassis. The rotatable housing may rotate about a first axis that is perpendicular to a plane defined by a mounting base. The multiple LIDAR components may be aimed outward from the swivel housing at different directions between a first direction along the first axis and a second direction along a second axis that is perpendicular to the first axis. The directions may range up to 90 degrees in separation. When the rotatable housing is rotated completely around the first axis that is perpendicular to the base, the multiple LIDAR components may scan a first field of view of 360 degrees around the first axis and may scan a second field of view of substantially 180 degrees about the second axis.

In some embodiments, the modular LIDAR system may be mounted on or coupled to an underside of an aircraft, such as an unmanned aerial vehicle (UAV), and used to determine distances of objects in most or all directions outward and below the aircraft (towards the earth). The modular LIDAR system may rotate a high speeds such that samples of the same scene or object are taken at a rate of over one hundred samples per second. The LIDAR components may be arranged to provide resolution fidelity of objects located within 100 meters of the module LIDAR array, which may enable the aircraft to detect objects and distances from those objects and/or recognize objects when landing or navigating near objects.

The techniques and systems described herein may be implemented in a number of ways. Example implementations are provided below with reference to the following figures.

Figure 1:
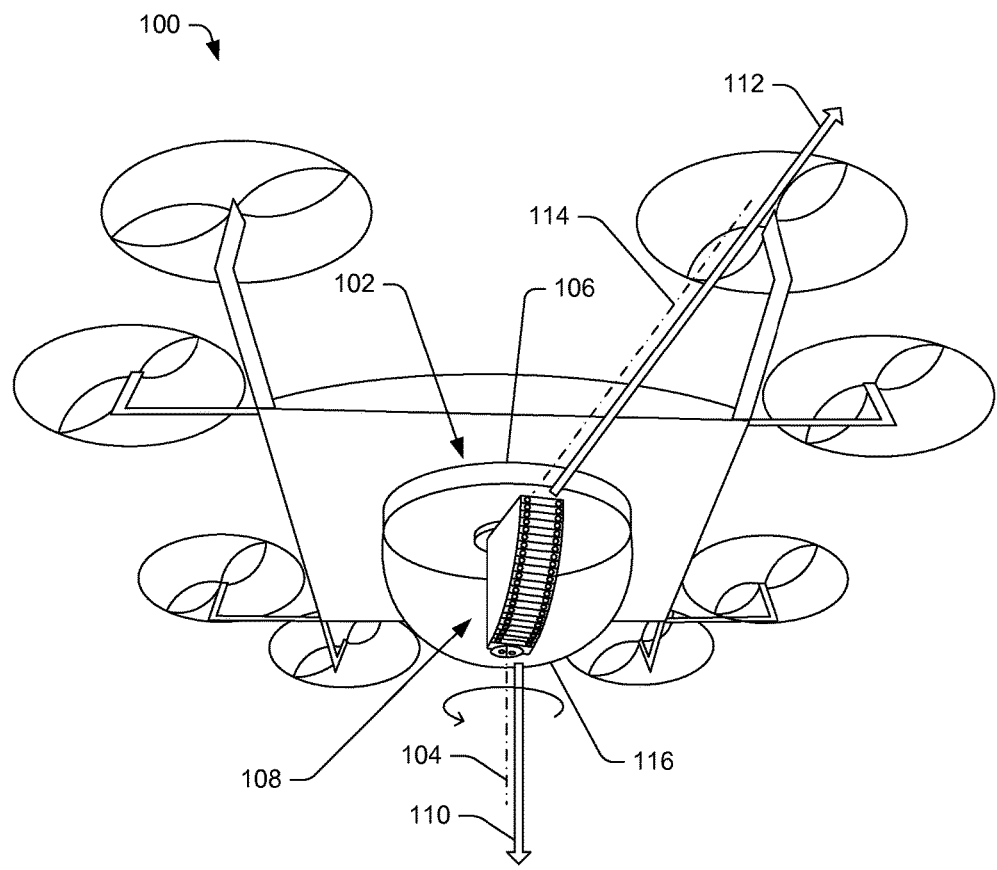
FIG. 1 is a low elevation isometric view of an unmanned aerial vehicle (UAV) that includes an illustrative modular LIDAR system.

FIG. 1 is a low elevation isometric view of an illustrative unmanned aerial vehicle (UAV) 100 that includes an illustrative modular LIDAR system 102. The UAV 100 may be implemented as virtually any type of aircraft. In some embodiments, the UAV 100 may be a multi-rotor vertical takeoff and landing vehicle, such as a quadcopter, octocopter, or other multi-rotor aerial vehicle. In various embodiments, the UAV 100 may include at least one fixed wing to provide at least some upward lift during forward flight of the UAV. The UAV 100 may be configured to transition from rotor flight to a fixed-wing flight during operation, such as by redirecting rotors/propellers from a lift configuration to a forward propulsion configuration when the UAV includes at least one wing that provides upward lift.

The UAV 100 may include the modular LIDAR system 102, which may collect data used to determine a distance between an object and the UAV, the ground (earth) and the UAV, and/or other distances. The modular LIDAR system 102 may provide data with resolution granularity to enable the UAV 100 to successfully avoid obstacles while landing and while flying through a dense environment that contains buildings, power lines, and other aircraft, among other obstacles. The modular LIDAR system 102 may be coupled to an underside of the UAV 100 and have an unobstructed or at least mostly unobstructed view of the ground (e.g., except possible obstruction of landing gear, etc.).

In operation, the modular LIDAR system 102 may rotate about a first axis 104 that is perpendicular to a plane defined by a mounting base 106. The rotation may be caused by a motor located in the base, in the rotatable swivel housing, or in another object (e.g., located in the UAV). Thus, the modular LIDAR system 102 may have a field of view of 360 degrees horizontally. The modular LIDAR system 102 may include LIDAR components arranged on a rotatable swivel housing 108. The multiple LIDAR components may be aimed outward from the swivel housing at different directions between a first direction 110 along the first axis 104 and a second direction 112 along a second axis 114 that is perpendicular to the first axis 104. The directions 110 and 112 may have up to 90 degrees in separation. When the rotatable swivel housing is rotated completely about the first axis 104, the multiple LIDAR components may scan a first field of view of 360 degrees about the first axis 104 and may scan a second field of view of substantially 180 degrees about the second axis 114.

The modular LIDAR system 102 may include a dome 116 to protect the LIDAR components and the rotatable swivel housing 108 from the environment. In some embodiments, the dome 116 may rotate with the rotatable swivel housing 108. In various embodiments, the rotatable swivel housing 108 may rotate within the dome 116 while the dome 116 remains stationary. The rotatable swivel housing 108 may include a counter weight such that rotation of the swivel housing causes minimal or no vibrations.

Figure 2:
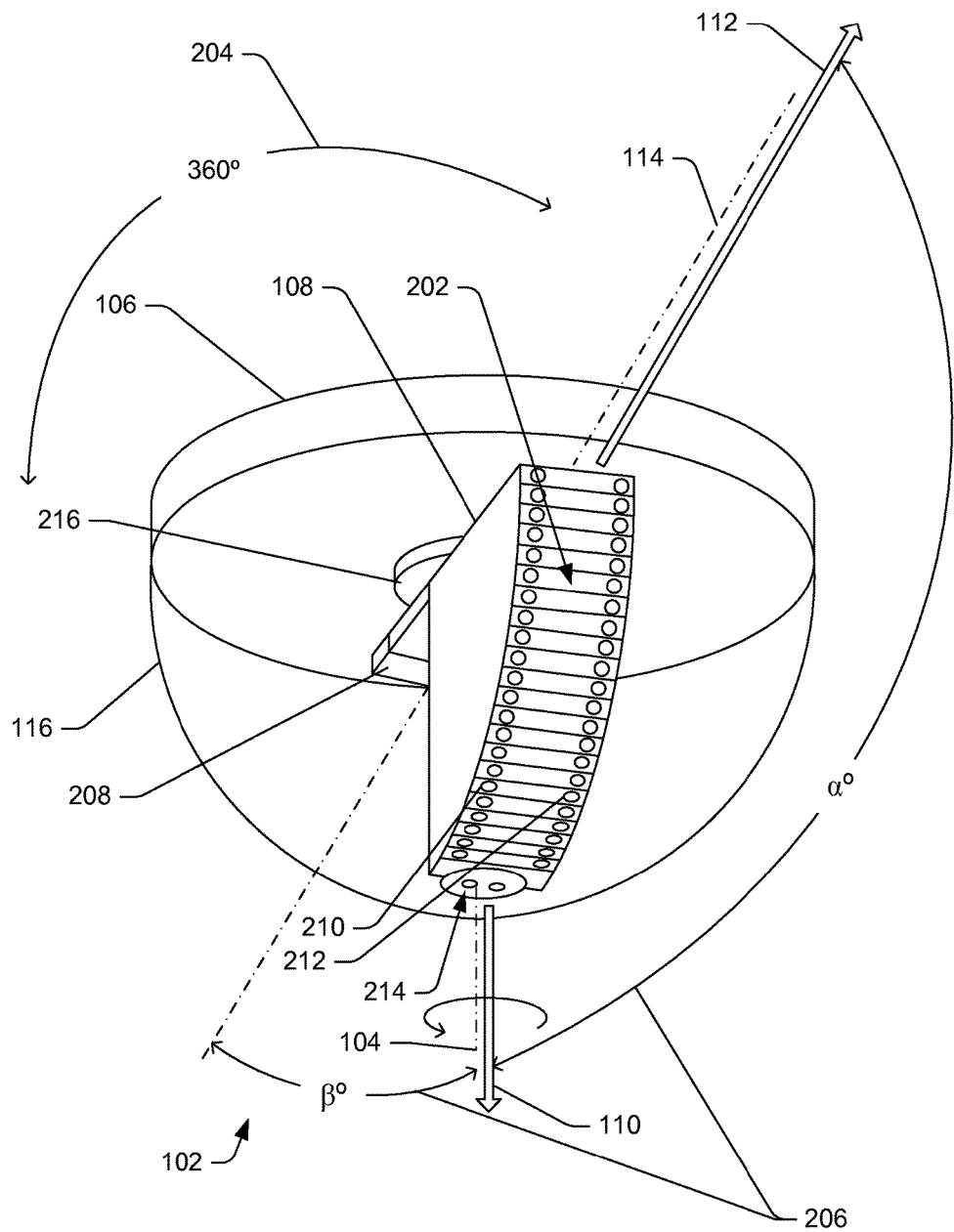
FIG. 2 is an isometric view of an illustrative modular LIDAR system including multiple LIDAR components in a single stack configuration, each having a laser emitter and a laser detector.

FIG. 2 is an isometric view of an illustrative modular LIDAR system 102 including multiple LIDAR components 202 in a single stack configuration, each having a laser emitter and a laser detector. As discussed above, the modular LIDAR system 102 may rotate about the first axis 104 that is perpendicular to a plane defined by the mounting base 106. Thus, the modular LIDAR system 102 may have a first field of view 204 of 360° degrees horizontally. The modular LIDAR system 102 may include the LIDAR components 202 arranged on the rotatable swivel housing 108, which may swivel on a swivel platform 216. The swivel platform 216 may include bearings, a motor, a drive shaft coupler (to receive a drive shaft from a motor), and/or other devices to enable rotation of the rotatable swivel housing 108 about the first axis 104. In some embodiments, the swivel platform 216 may be part of the mounting base 106. The multiple LIDAR components 202 may be aimed outward from the swivel housing at different directions between the first direction 110 along the first axis 104 and the second direction 112 along the second axis 114 that is perpendicular to the first axis 104. The directions may range up to a degrees in separation, which may be up to 90 degrees, up to 120 degrees, or up to somewhere between 90 and 120 degrees. When the rotatable swivel housing 108 is rotated, via the swivel platform 216, completely about the first axis 104, the multiple LIDAR components 202 may scan the first field of view 204 of 360° degrees about the first axis 104 and may scan a second field of view 206 of substantially 180° degrees ($\alpha°+\beta°=180°$) about the second axis 114. However, the actual second field of view 206 may be slightly less than 180° for design reasons and to maximize view of each LIDAR sensor. In some embodiments, the directions may range past 90 degrees in separation. For example, the directions may have a range of 120 degrees. In such an embodiment, the LIDAR components may have overlapping coverage in some parts of the area that is scanned, such as an area pointed nearly straight down toward the earth (when the modular LIDAR system is coupled to an underside of a UAV). In some embodiments, the field of view may be extended beyond 180°, although the modular LIDAR system 102 may then be mounted on a boom so that some of the scanned area is not blocked by an underside of the UAV and/or the mounting base.

The modular LIDAR system 102 may include the dome 116 to protect the LIDAR components 202 and the rotatable swivel housing 108 from the environment. For example, the dome 116 may protect the LIDAR components from foreign objects, such as dirt, water, and weather. In some embodiments, the dome 116 may rotate with the rotatable swivel housing 108. Rotation of the dome may reduce disturbance of airflow caused by the rotation as compared to rotation of a planar surface, such as the rotatable swivel housing without the dome 116. However, in various embodiments, the rotatable swivel housing 108 may rotate within the dome 116 while the dome 116 remains stationary. In at least some embodiments, the dome may not be included in the modular LIDAR system 102.

The rotatable swivel housing 108 may include a counter weight 208. The counter weight 208 may have a same or nearly a same weight as the rotatable swivel housing 108. The counter weight 208 may have a center of mass located at an equal and opposite location of a center of mass of the rotatable swivel housing 108, in relation to the first axis 104. Thus, the counter weight 208 may balance the rotatable swivel housing 208 during rotation about the first axis 104 to reduce vibrations caused by the rotation. The counter weight 208 may not be implemented or may be minimized in some designs, such as the design shown in FIG. 4B that includes a multi-sided modular LIDAR system.

The LIDAR components 202 may include a laser emitter 210 and a laser detector 212. The LIDAR component 202 is discussed in further detail with reference to FIG. 5. The LIDAR components 202 may be stacked together as shown in FIG. 2 and aimed at different directions along and/or between the first direction 110 and the second direction 112. A LIDAR component 214 may be included in an axel and aimed along the first direction 110.

When sampling data using the LIDAR components 202, the data may be received in a series, and thus each LIDAR component may transmit data at a different time. However, in some embodiments, multiple LIDAR components may transmit data at a same time or during overlapping time periods. A LIDAR controller may distinguish between signals based on characteristics of the signals, such as a frequency, a range, and/or other information. Thus, in some embodiments, the LIDAR controller may processes signals in parallel, thereby processing multiple signals concurrently.

Figure 3:
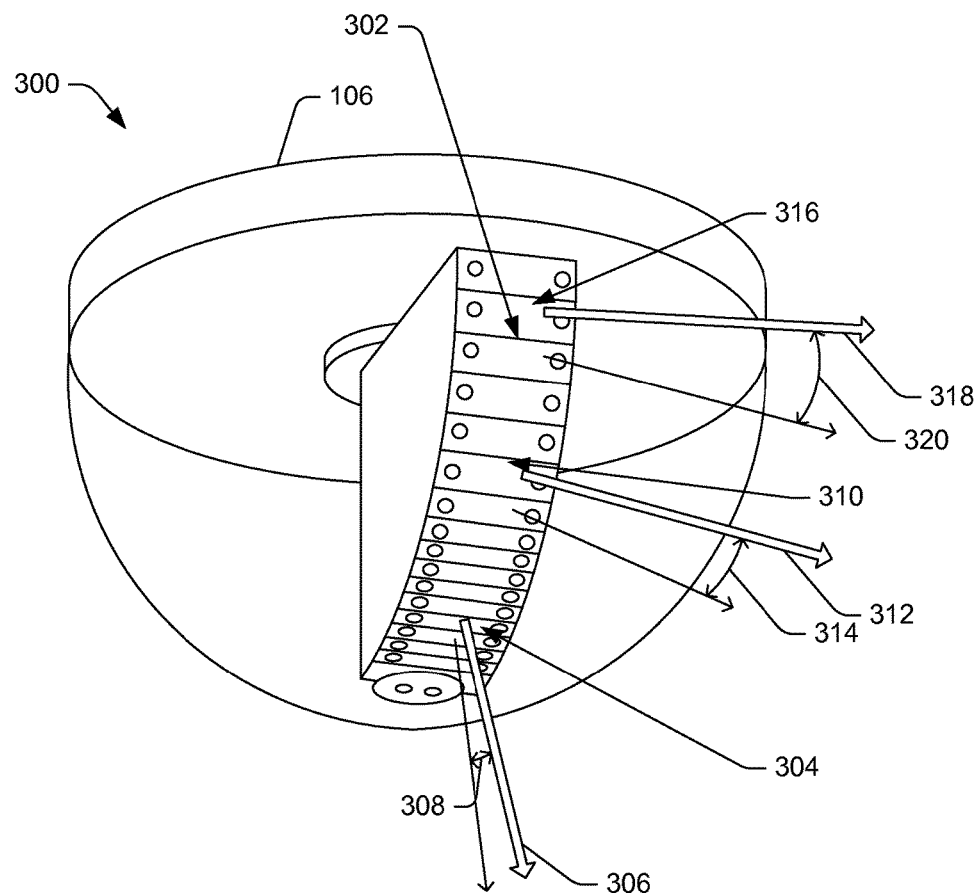
FIG. 3 is an isometric view of another illustrative modular LIDAR system having inconsistent spacing between LIDAR components.

FIG. 3 is an isometric view of another illustrative modular LIDAR system 300 having inconsistent spacing between LIDAR components 302. A first LIDAR component 304 may be aimed at a first direction 306 having a first angle 308 between the first direction 306 and a direction of an adjacent LIDAR component. A second LIDAR component 310 may be aimed at a second direction 312 having a second angle 314 between the second direction 312 and a direction of an adjacent LIDAR component. A third LIDAR component 316 may be aimed at a third direction 318 having a third angle 320 between the third direction 318 and a direction of an adjacent LIDAR component. In some embodiments, the first angle 308, the second angle 314, and the third angle 320 may be different angles. For example, the first angle 308 may be less than the second angle 314 and the second angle 314 may be less than the third angle 320. Thus, the direction of LIDAR components may include broader spacing near the horizontal set, as oriented under a UAV as shown in FIG. 1.

Figure 4A:
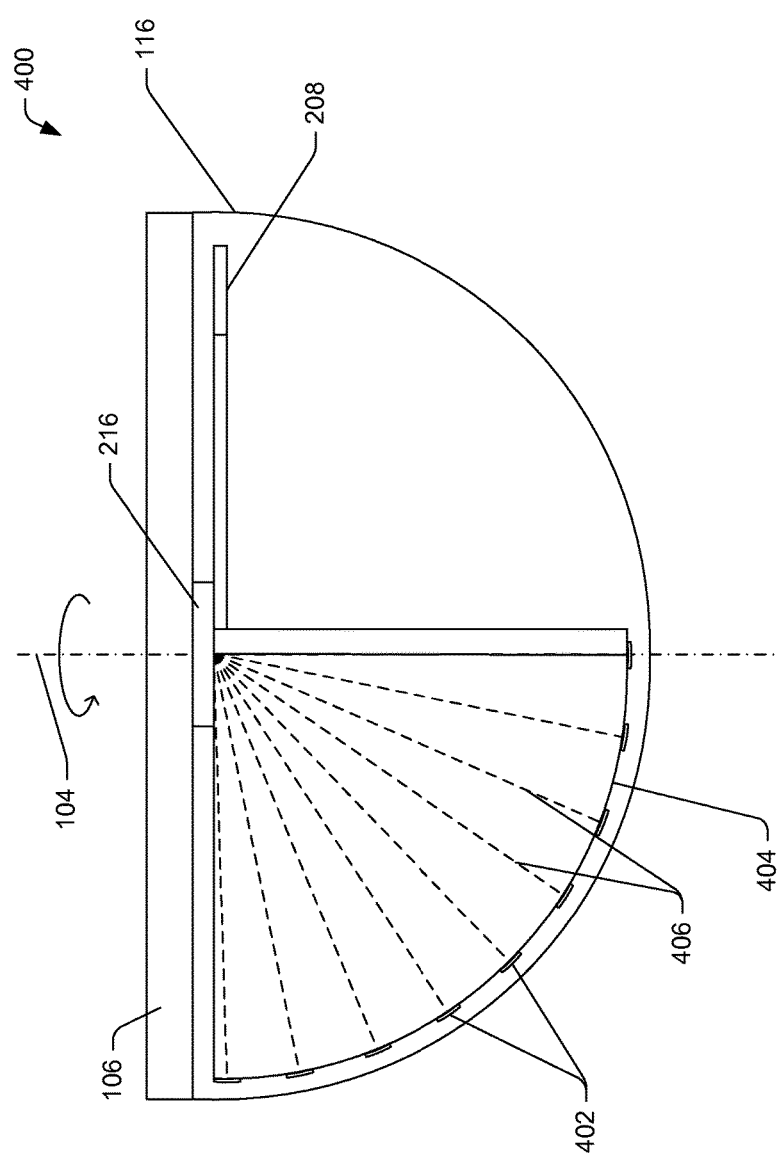
FIG. 4A is a side elevation view of an illustrative modular LIDAR system using LIDAR components arranged in a stack configuration spanning up to ninety degrees.

FIG. 4A is a side elevation view of an illustrative modular LIDAR system 400 using LIDAR components arranged in a stack configuration spanning up to ninety degrees. The modular LIDAR system 400 depicts a similar configuration as shown in FIG. 2. The modular LIDAR system 400 may include the swivel platform 216, the counter weight 208, and the dome 116, as described above.

As shown in FIG. 4A, a first stack of LIDAR components 402 on a first portion of a rotatable swivel housing 404 intersect reference lines 406 (which, shown in dashed lines for description purposes, evenly divide the first portion of the rotatable swivel housing 404 into 11.25° degree segments). More or fewer stacks may also be implemented in the modular LIDAR system 400, depending on space constraints. A variation of the modular LIDAR system 400 may include LIDAR components 402 that are not evenly spaced relative the reference lines, such as discussed above and shown in FIG. 3. Thus, the distance between the LIDAR components 402 or angle between directions of each of the LIDAR components 402 may be consistent (as shown in FIG. 2) or inconsistent (as shown in FIG. 3).

Figure 4B:
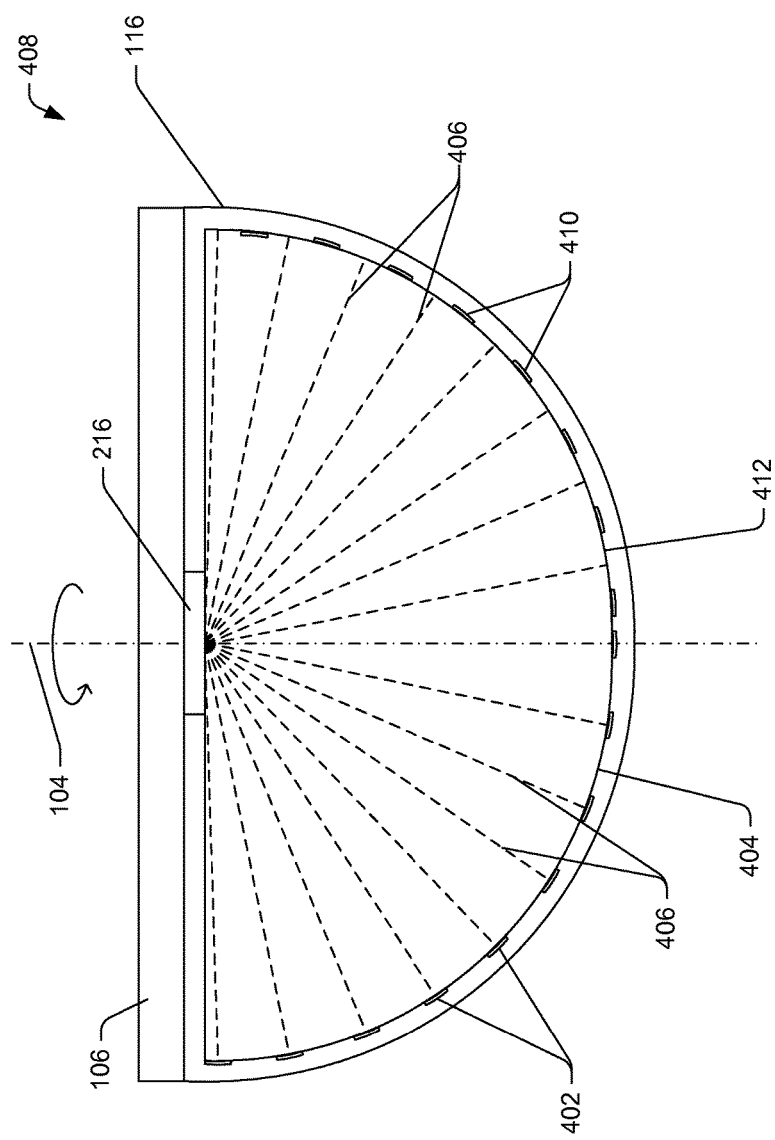
FIG. 4B is a side elevation view of yet another illustrative modular LIDAR system using LIDAR components arranged in at least two different stack configurations to provide finer resolution granularity when scanning objects as compared to use of LIDAR components configured in a single stack configuration.

FIG. 4B is a side elevation view of yet another illustrative modular LIDAR system 408 using LIDAR components arranged in at least two different stack configurations to provide finer resolution granularity when scanning objects during rotation about the first axis 104 as compared to use of LIDAR components configured in a single stack configuration (e.g., shown in FIG. 2). As shown in FIG. 4B, the first stack of LIDAR components 402 on the first portion of a rotatable swivel housing 404 intersect the reference lines 406 (which, shown in dashed lines for description purposes, evenly divide the first portion of the rotatable swivel housing 404 into 11.25° degree segments). A second stack of LIDAR components 410 on a second portion of a rotatable swivel housing 412 are between the reference lines 406 (which, shown in dashed lines for description purposes, evenly divide the second portion of the rotatable swivel housing 412 into 11.25° degree segments). Additional stacks may also be implemented in the modular LIDAR system 408, depending on space constraints. By offsetting the LIDAR components on each stack, the LIDAR components, working together, may enable the modular LIDAR system 408 to scan objects at a finer resolution granularity than possible when using a single stack of LIDAR components since space constraints may cause a single stack to be constrained to a limited number of LIDAR components, and thus dictate an angle between directions of those LIDAR components.

The modular LIDAR system 408 may include the swivel platform 216 to facilitate rotation of the modular LIDAR system 408 about the first axis 104. In some embodiments, the modular LIDAR system 408 may include the dome 116. However, since the modular LIDAR system 408 is substantially symmetrical, the dome 116 may be omitted or may rotate with the modular LIDAR system 408.

Figure 4C:
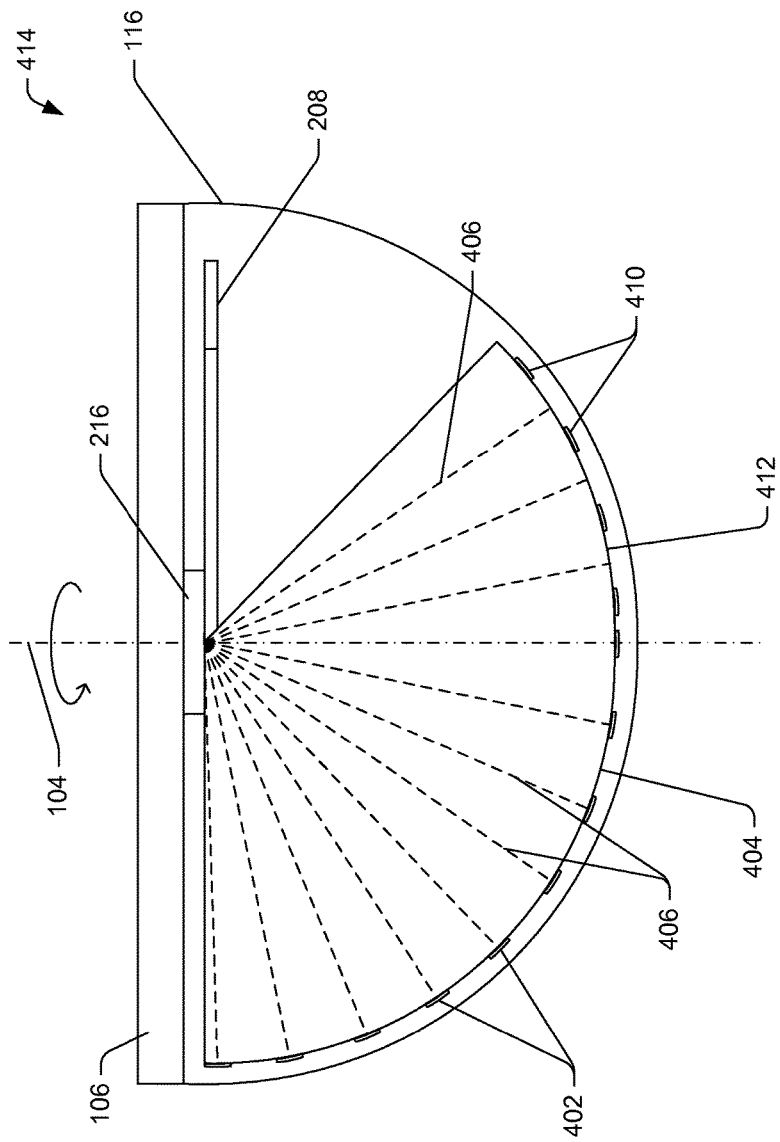
FIG. 4C is a side elevation view of another illustrative modular LIDAR system using LIDAR components arranged in at least two different stack configurations and spanning between ninety degrees and one hundred eighty degrees.

FIG. 4C is a side elevation view of another illustrative modular LIDAR system 414 using LIDAR components arranged in at least two different stack configurations and spanning between ninety degrees and one hundred eighty degrees. As shown in FIG. 4C, the first portion of the rotatable swivel housing 404 may be similar to that shown in FIG. 4A. The modular LIDAR system 414 may include a consolidated or smaller version of the second portion of the rotatable swivel housing 412, which may span between zero degrees and ninety degrees. Thus, the span of the entire modular LIDAR system 414 may span between ninety degrees and one hundred eighty degrees. For illustrative purposes, the modular LIDAR system 414 is depicted in FIG. 4C as spanning about one hundred and twenty degrees. As discussed above, by offsetting the LIDAR components on each stack, the LIDAR components, working together, may enable the modular LIDAR system 408 to scan objects at a finer resolution granularity than a resolution granularity that may be possible when using a single stack of LIDAR components since space constraints may cause a single stack to be constrained to a limited number of LIDAR components, and thus dictate an angle between directions of those LIDAR components. In the configuration shown in FIG. 4C, the LIDAR components may have overlapping coverage in some parts of the area that is scanned, such as an area pointed nearly straight down toward the earth, such as when the modular LIDAR system 414 is coupled to an underside of a UAV.

Figure 4D:
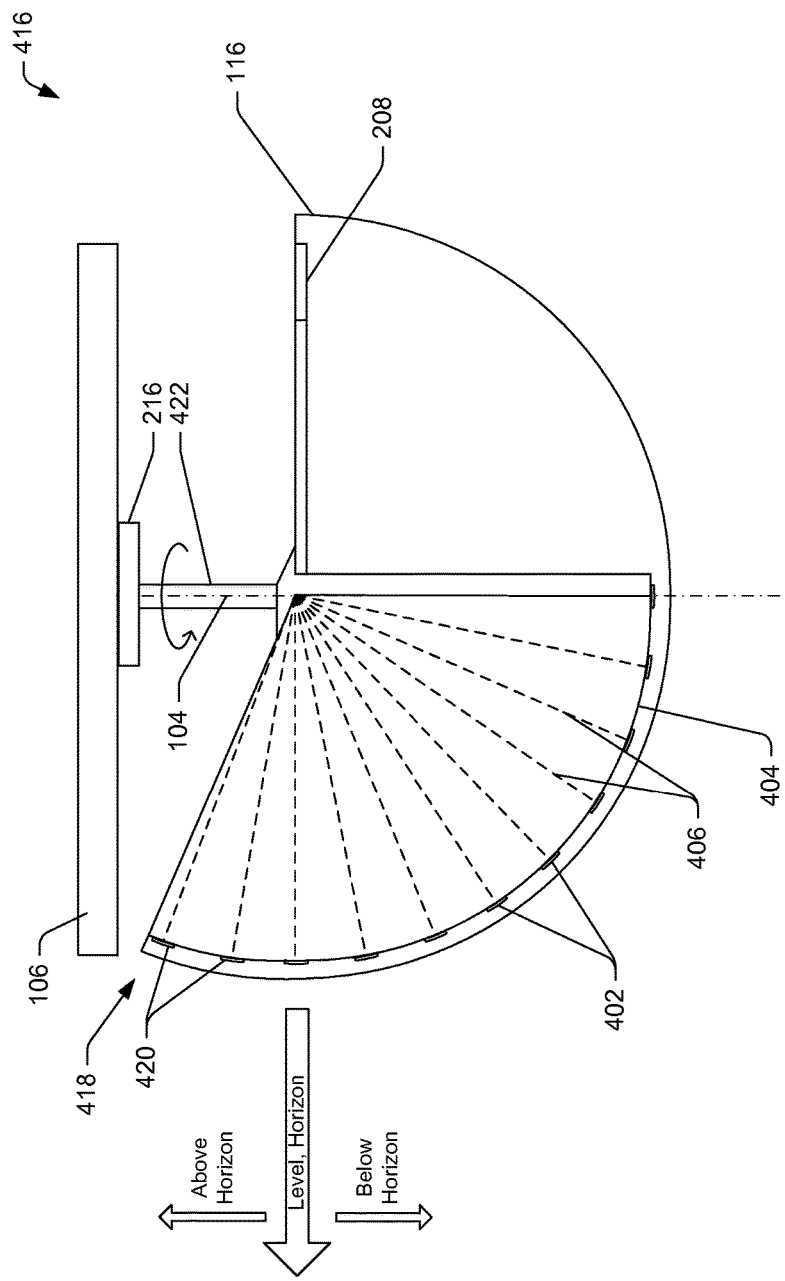
FIG. 4D is a side elevation view of still another illustrative modular LIDAR system using LIDAR components arranged in a stack configuration with at least some LIDAR components aimed above the horizon.

FIG. 4D is a side elevation view of still another illustrative modular LIDAR system 416 using LIDAR components arranged in a stack configuration with at least some LIDAR components aimed above the horizon. The LIDAR system 416 is similar to the LIDAR system 400, but includes an addition housing extension 418 of the rotatable swivel housing 404 that houses LIDAR components 420 that are aimed above the horizon, as illustrated in FIG. 4D. The LIDAR system 416 may include a boom 422 to create an offset distance between the rotatable swivel housing 404 and the swivel platform 216. The offset distance may enable a clear line of sight by LIDAR components in the addition housing extension 418, without being blocked by the mounting base 106, a body of a UAV, and/or other structures. The LIDAR system 416 may, when rotated in a full rotation about the first axis 104, and thus about a horizontal field of view, provide capture of data to perform distance measurement of objects in greater than 180 degrees of vertical field of view, and thus may measure distance of objects located above the horizon.

Figure 4E:
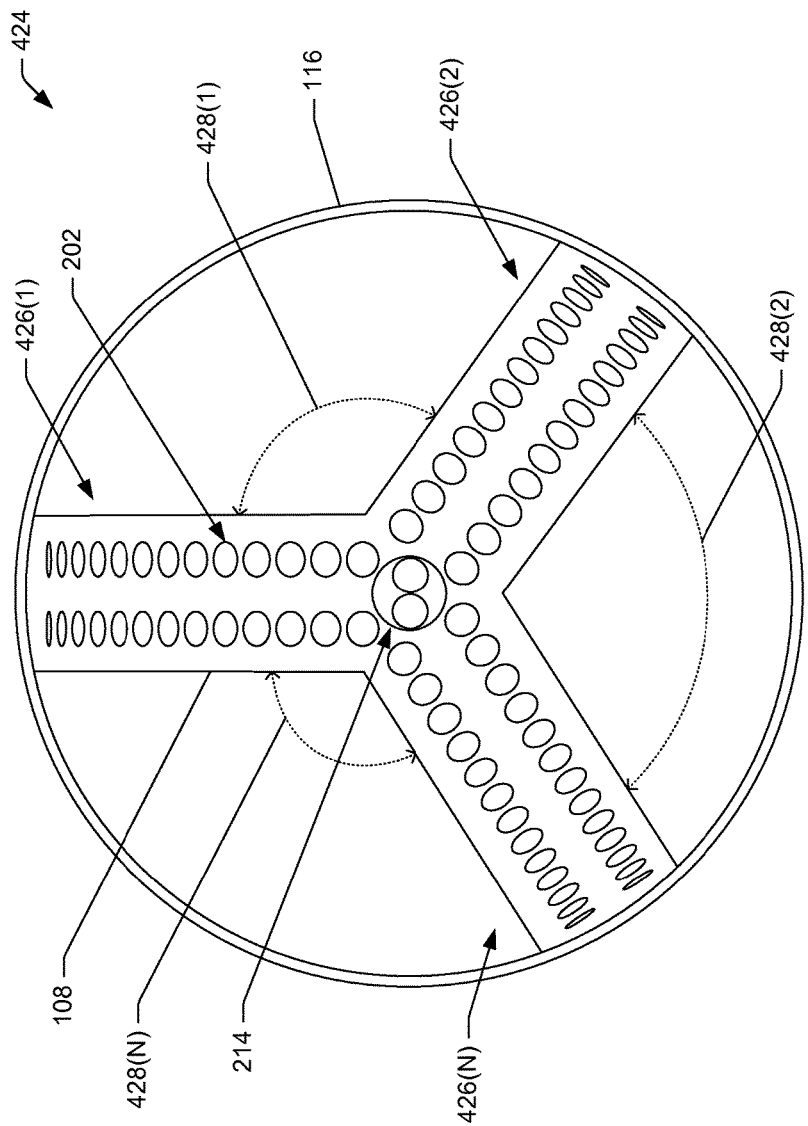
FIG. 4E is a top plan view of yet another illustrative modular LIDAR system using LIDAR components arranged in various stack configurations.

FIG. 4E is a top plan view of yet another illustrative modular LIDAR system 424 using LIDAR components arranged in various stack configurations. The LIDAR system 424 may include multiple stack configurations 426, such as stack configurations 426(1), 426(2), . . . 426(N). Angles 428(1)-(N) between stacks may be determined based on design requirements, and may or may not create symmetry. For example, the angle 428(1) is defined as between the stack components 426(1) and 426(2). Although the LIDAR components 202 are shown in straight rows in each stack, the LIDAR components may also be shifted by a distance (or angle) such that the LIDAR component are not all aimed in a same general direction (e.g., west, east, etc.) at a same time. In some embodiments, the LIDAR components on a first stack component and a second stack component may be used to determine velocity after a first pass (e.g., a full rotation about the first axis 104, and thus about a horizontal field of view). Acceleration may be determined after a subsequent rotation (i.e., second pass).

Figure 5:
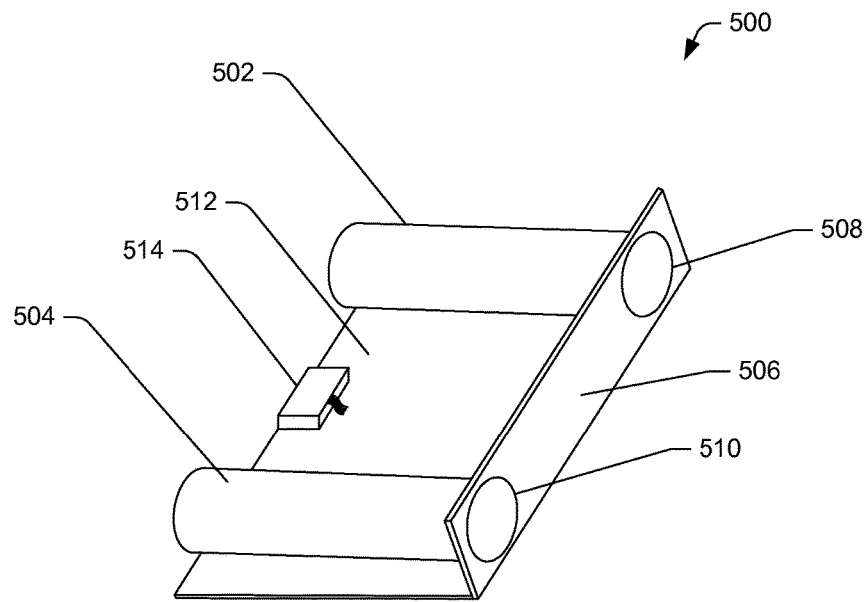
FIG. 5 is an isometric diagram of an illustrative LIDAR component that includes a laser emitter and a laser detector configured in a frame.

FIG. 5 is an isometric diagram of an illustrative LIDAR component 500 that includes at least one laser emitter 502 and at least one laser detector 504 configured in a frame 506 that securely positions and aims the laser emitter 502 and the laser detector 504. The laser emitter 502 may include a first lens 508 through which one or more laser beams or orientations may be emitted while the laser detector 504 may include a second lens 510 through which the one or more laser beams or orientations emitted by the first lens 508 are received. The LIDAR component 500 may include a circuit board 512 that include embedded logic and wiring to capture and route signals from the components and/or to provide power to the components. The circuit board may include the ability to perform a degree of processing of the received sensor data, and capture the rotational position of a rotatable swivel housing. Thus, the circuit board 512 may have power connectors and data signal connections. The circuit board 512 may include one or more connectors 514 that plug into complementary connectors of the rotatable swivel housing for data and power.

The LIDAR components 500 may be inserted into a rotatable swivel housing (or chassis), such as the rotatable swivel housing 108. For example, the rotatable swivel housing may include a plurality of slots that accept insertion and coupling of a LIDAR component (i.e., one LIDAR component for each slot). Thus, use of the LIDAR components may enable a plug-and-play configuration where a rotatable swivel housing may be populated with LIDAR components aimed at directions to meet design requirements of a specific application, such as resolution granularity. Additionally, such plug-and-play modularity may simplify and speed up the manufacture and repair of the LIDAR assemblies 102, 300, 400, 408, and/or 414 shown above.

Figure 6:
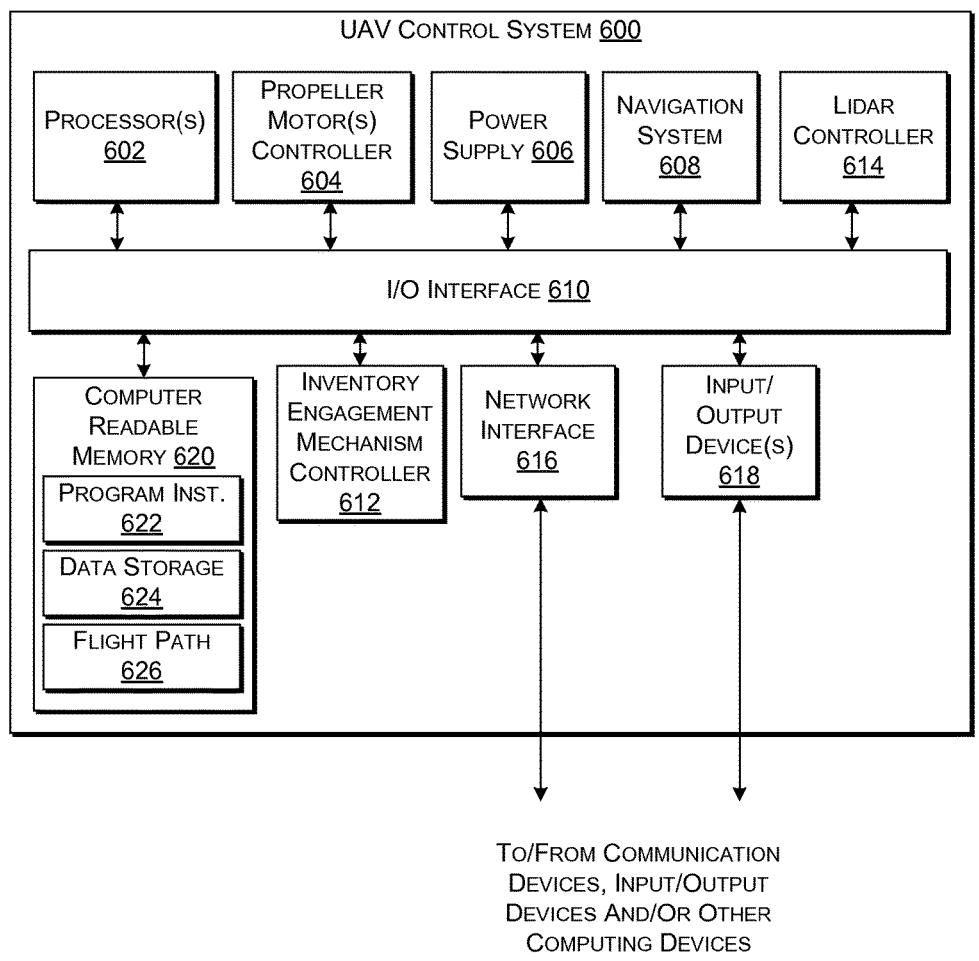
FIG. 6 is a block diagram of an illustrative control system of a UAV.

FIG. 6 is a block diagram of an illustrative control system 600 of the UAV. In various examples, the block diagram may be illustrative of one or more aspects of the UAV control system 600 that may be used to implement the various systems, devices, and techniques discussed above. In the illustrated implementation, the UAV control system 600 includes one or more processors 602, coupled to a non-transitory computer readable storage medium 620 via an input/output (I/O) interface 610. The UAV control system 600 may also include a propeller motor controller 604, power supply module 606, and/or a navigation system 608. The UAV control system 600 further includes an inventory engagement mechanism controller 612, a UAV airbag LIDAR controller 614, a network interface 616, and one or more input/output devices 618.

In various implementations, the UAV control system 600 may be a uniprocessor system including one processor 602, or a multiprocessor system including several processors 602 (e.g., two, four, eight, or another suitable number). The processor(s) 602 may be any suitable processor capable of executing instructions. For example, in various implementations, the processor(s) 602 may be general-purpose or embedded processors implementing any of a variety of instruction set architectures (ISAs), such as the x86, PowerPC, SPARC, or MIPS ISAs, or any other suitable ISA. In multiprocessor systems, each processor(s) 602 may commonly, but not necessarily, implement the same ISA.

The non-transitory computer readable storage medium 620 may be configured to store executable instructions, data, flight paths, and/or data items accessible by the processor(s) 602. In various implementations, the non-transitory computer readable storage medium 620 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described above, are shown stored within the non-transitory computer readable storage medium 620 as program instructions 622, data storage 624 and flight path data 626, respectively. In other implementations, program instructions, data, and/or flight paths may be received, sent, or stored upon different types of computer-accessible media, such as non-transitory media, or on similar media separate from the non-transitory computer readable storage medium 620 or the UAV control system 600. Generally speaking, a non-transitory, computer readable storage medium may include storage media or memory media such as flash memory (e.g., solid state memory), magnetic or optical media (e.g., disk) coupled to the UAV control system 600 via the I/O interface 610. Program instructions and data stored via a non-transitory computer readable medium may be transmitted by transmission media or signals such as electrical, electromagnetic, or digital signals, which may be conveyed via a communication medium such as a network and/or a wireless link, such as may be implemented via the network interface 616.

In one implementation, the I/O interface 610 may be configured to coordinate I/O traffic between the processor(s) 602, the non-transitory computer readable storage medium 620, and any peripheral devices, the network interface or other peripheral interfaces, such as input/output devices 618. In some implementations, the I/O interface 610 may perform any necessary protocol, timing or other data transformations to convert data signals from one component (e.g., non-transitory computer readable storage medium 620) into a format suitable for use by another component (e.g., processor(s) 602). In some implementations, the I/O interface 610 may include support for devices attached through various types of peripheral buses, such as a variant of the Peripheral Component Interconnect (PCI) bus standard or the Universal Serial Bus (USB) standard, for example. In some implementations, the function of the I/O interface 610 may be split into two or more separate components, such as a north bridge and a south bridge, for example. Also, in some implementations, some or all of the functionality of the I/O interface 610, such as an interface to the non-transitory computer readable storage medium 620, may be incorporated directly into the processor(s) 602.

The propeller motor(s) controller 604 communicates with the navigation system 608 and adjusts the power of each propeller motor to guide the UAV along a determined flight path. The power supply module 606 may control the charging and any switching functions associated with one or more power modules (e.g., batteries) of the UAV.

The navigation system 608 may include a GPS or other similar system that can be used to navigate the UAV to and/or from a location. The inventory engagement mechanism controller 612 communicates with the actuator(s) or motor(s) (e.g., a servo motor) used to engage and/or disengage inventory. For example, when the UAV is positioned over a level surface at a delivery location, the inventory engagement mechanism controller 612 may provide an instruction to a motor that controls the inventory engagement mechanism to release the inventory.

The LIDAR controller 614 may capture and process signals from the various LIDAR components of a modular LIDAR system, such as the modular LIDAR systems 102, 300, 400, 408, and/or 414 shown above. The LIDAR controller 604 may process the signals to determine distances of objects in various directions, such as relative to a coordinate system used by the UAV. The LIDAR controller 604 may process the signals to map surfaces of objects, which may be used in part to identify those objects, such as to identify a landing zone, a building, a sign, and so forth. In some embodiments, the LIDAR controller may include redundant hardware to enable parallel processing of signals from the LIDAR components.

The network interface 616 may be configured to allow data to be exchanged between the UAV control system 600, other devices attached to a network, such as other computer systems, and/or with UAV control systems of other UAVs. For example, the network interface 616 may enable wireless communication between numerous UAVs. In various implementations, the network interface 616 may support communication via wireless general data networks, such as a Wi-Fi network. For example, the network interface 616 may support communication via telecommunications networks such as cellular communication networks, satellite networks, and the like.

Input/output devices 618 may, in some implementations, include one or more displays, image capture devices, thermal sensors, infrared sensors, time of flight sensors, accelerometers, pressure sensors, weather sensors, airflow sensors, etc. Multiple input/output devices 618 may be present and controlled by the UAV control system 600. One or more of these sensors may be utilized to assist in landings as well as avoiding obstacles during flight.

As shown in FIG. 6, the memory may include program instructions 622 which may be configured to implement the example processes and/or sub-processes described above. The data storage 624 may include various data stores for maintaining data items that may be provided for determining flight paths, retrieving inventory, landing, identifying a level surface for disengaging inventory, causing movement of ballast, etc.

In various implementations, the parameter values and other data illustrated herein as being included in one or more data stores may be combined with other information not described or may be partitioned differently into more, fewer, or different data structures. In some implementations, data stores may be physically located in one memory or may be distributed among two or more memories.

Those skilled in the art will appreciate that the UAV control system 600 is merely illustrative and is not intended to limit the scope of the present disclosure. In particular, the computing system and devices may include any combination of hardware or software that can perform the indicated functions, including computers, network devices, internet appliances, PDAs, wireless phones, pagers, etc. The UAV control system 600 may also be connected to other devices that are not illustrated, or instead may operate as a stand-alone system. In addition, the functionality provided by the illustrated components may in some implementations be combined in fewer components or distributed in additional components. Similarly, in some implementations, the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the illustrated UAV control system 600. Some or all of the system components or data structures may also be stored (e.g., as instructions or structured data) on a non-transitory, computer-accessible medium or a portable article to be read by an appropriate drive, various examples of which are described above. In some implementations, instructions stored on a computer-accessible medium separate from the UAV control system 600 may be transmitted to the UAV control system 600 via transmission media or signals such as electrical, electromagnetic, or digital signals, conveyed via a communication medium such as a wireless link. Various implementations may further include receiving, sending, or storing instructions and/or data implemented in accordance with the foregoing description upon a computer-accessible medium. Accordingly, the techniques described herein may be practiced with other UAV control system configurations.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A LIDAR system comprising:
   a swivel housing rotatably coupled to a frame of an unmanned aerial vehicle, the swivel housing configured to rotate about a first axis that is substantially perpendicular to a horizontal plane defined by the frame;
   LIDAR components coupled to the swivel housing, the LIDAR components aimed outward from the swivel housing at different orientations between a first orientation along the first axis and a second orientation along a second axis that is angularly offset relative to the first axis, each LIDAR component including at least one laser emitter and at least one laser detector; and
   a motor to cause rotation of the swivel housing relative to the frame, wherein a full 360 degrees rotation of the swivel housing about the first axis creates a horizontal field of view that provides capture of data to perform distance measurement of objects in substantially 180 degrees of a vertical field of view.

2. The LIDAR system as recited in claim 1, wherein the first and the second orientations are angularly offset for positioning the LIDAR components on different sides of a plane that is parallel with the first axis, the positioning to create overlapping scanning of the vertical field of view that increases a resolution of the data used to perform the distance measurement of the objects.

3. The LIDAR system as recited in claim 1, wherein the LIDAR system further comprises a dome to enclose the swivel housing and protect the swivel housing from at least environmental conditions.

4. The LIDAR system as recited in claim 1, wherein the LIDAR system further comprises a counter weight to counter balance the swivel housing when rotated about the first axis.

5. An apparatus comprising:
   a mounting base;
   a swivel housing rotatably coupled to the mounting base, the swivel housing configured to rotate about a first axis that is perpendicular to a plane defined by the mounting base; and
   LIDAR components coupled to the swivel housing, the LIDAR components aimed outward from the swivel housing at different orientations between a first orientation along the first axis and a second orientation along a second axis that is angularly offset relative to the first axis, each LIDAR component including at least one laser emitter and at least one laser detector,
   wherein in a full rotation of the swivel housing about a horizontal field of view provides capture of data to perform distance measurement of objects in at least 180degrees of vertical field of view.

6. The apparatus as recited in claim 5, wherein the swivel housing comprises a chassis that includes slots that accept individual ones of the LIDAR components to create a modular LIDAR system.

7. The apparatus as recited in claim 5, further comprising a first LIDAR component that is aimed along the first axis and a second LIDAR component that is aimed along the second axis.

8. The apparatus as recited in claim 5, further comprising a LIDAR component that is aimed along the first orientation and away from the mounting base.

9. The apparatus as recited in claim 5, further comprising an unmanned aerial vehicle (UAV), and wherein the mounting base is coupled to an underside of the UAV to enable measurement of distances of objects generally below the UAV while the UAV is in flight.

10. The apparatus as recited in claim 5, wherein the first and the second orientations are offset by less than 90 degrees.

11. The apparatus as recited in claim 5, wherein the first and the second orientations are angularly offset for positioning the LIDAR components on different sides of a plane that is parallel with the first axis, the positioning to create overlapping scanning of the vertical field of view that increases a resolution of the data used to perform the distance measurement of the objects.

12. The apparatus as recited in claim 5, wherein the LIDAR components are coupled to the swivel housing in a non-planar arrangement that offsets at least some of the LIDAR components in a plane that does not intersect both the first axis and the second axis.

13. The apparatus as recited in claim 5, further comprising a motor to cause the swivel housing to rotate relative to the mounting base.

14. The apparatus as recited in claim 5, further comprising a counter weight to counter balance the swivel housing when rotated about the first axis.

15. The apparatus as recited in claim 5, further comprising a dome that covers the swivel housing to protect the swivel housing from foreign objects including weather.

16. The apparatus as recited in claim 15, wherein the dome rotates with the swivel housing.

17. A system comprising:
a swivel housing rotatably coupled to a frame, the swivel housing configured to rotate about a first axis that is substantially perpendicular to a horizontal plane defined by the frame;
LIDAR components coupled to the swivel housing, the LIDAR components aimed outward from the swivel housing at different orientations between a first orientation along the first axis and a second orientation along a second axis that is angularly offset relative to the first axis, wherein at least one LIDAR component is aimed along the first orientation along the first axis; and
a motor to cause a full 360 degrees rotation of the swivel housing relative to the frame and about the first axis to create a horizontal field of view that provides capture of data to perform distance measurement of objects in a vertical field of view defined between the first orientation along the first axis and the second orientation along a second axis that is angularly offset relative to the first axis.

18. The system as recited in claim 17, wherein each LIDAR component include at least one laser emitter and at least one laser detector.

19. The system as recited in claim 17, further comprises a dome to at least partially enclose the swivel housing.

20. The system as recited in claim 17, wherein the swivel housing comprises a chassis that includes slots that accept individual ones of the LIDAR components to create a modular LIDAR system.

* * * * *